United States Patent [19]

Riggle et al.

[11] Patent Number: 5,724,539
[45] Date of Patent: Mar. 3, 1998

[54] SYSTEM FOR SELECTIVELY STORING STRIPES OF DATA IN TRACKS OF DISKS SO THAT SUM OF TRANSFER RATES OF STRIPES MATCH COMMUNICATION BANDWIDTH TO HOST

[75] Inventors: Charles Michael Riggle, Colorado Springs, Colo.; Bruce D. Buch, Westboro, Mass.

[73] Assignee: Digital Equipment Corporation, Maynard, Mass.

[21] Appl. No.: 223,378

[22] Filed: Apr. 5, 1994

Related U.S. Application Data

[63] Continuation of Ser. No. 854,102, Mar. 19, 1992, abandoned.
[51] Int. Cl.[6] ............................................. G06F 12/00
[52] U.S. Cl. ................... 395/427; 395/200.09; 370/468; 370/477
[58] Field of Search .............................. 395/275, 425, 395/849, 850, 853, 855, 439, 441, 484, 427, 200.09; 370/468, 477; 364/256.08

[56] References Cited

U.S. PATENT DOCUMENTS

| 4,977,472 | 12/1990 | Volz et al. ........................ 360/78.14 |
| 5,148,432 | 9/1992 | Gordon et al. ...................... 371/10.1 |
| 5,191,584 | 3/1993 | Anderson .......................... 371/51.1 |
| 5,210,860 | 5/1993 | Pfeffer et al. ....................... 395/575 |
| 5,226,010 | 7/1993 | Glider et al. .................... 365/189.04 |
| 5,276,679 | 1/1994 | McKay et al. ......................... 370/84 |

OTHER PUBLICATIONS

"New Direction in Switching Networks", Kundis & Hartman, 1986 International Zurich Seminar on Digital Communications.

*Primary Examiner*—Thomas C. Lee
*Assistant Examiner*—Ki S. Kim
*Attorney, Agent, or Firm*—Cathy L. Peterson; Ronald C. Hudgens; Arthur W. Fisher

[57] ABSTRACT

A method and apparatus for bandwidth balancing of data transfer operations between a computer and a storage subsystem are disclosed. The storage subsystem contains a number of storage devices such as magnetic disk drives. Data to be stored is supplied by the computer to the storage subsystem in the form of a transfer unit through a communication channel. The storage subsystem divides the transfer unit into a number of stripes of a pre-determined size. Each stripe is allocated to a separate disk drive whose disk surfaces are formatted into a number of track bands. Each track band is composed of several contiguous tracks associated with the same data transfer rate. Each stripe is then stored on its disk drive within a selected track band. Both data storage and retrieval from each disk drive occur at the data transfer rate associated with the accessed track band. Since all the stripes in the transfer unit are transferred to their disk drives simultaneously, the transfer operation occurs at an aggregate transfer rate equal to the sum of the individual track band transfer rates. The storage subsystem selects the track bands on each disk drive in such a manner as to ensure that the data transfer operation occurs at an aggregate transfer rate within a pre-determined bandwidth range of the communication channel bandwidth.

14 Claims, 7 Drawing Sheets

SYSTEM FOR SELECTIVELY STORING STRIPES OF DATA IN TRACKS OF DISKS SO THAT SUM OF TRANSFER RATES OF STRIPES MATCH COMMUNICATION BANDWIDTH TO HOST

This application is a continuation of application Ser. No. 07/854,102 filed Mar. 19, 1992, now abandoned.

FIELD OF THE INVENTION

The invention relates to mass data storage subsystems and more particularly to organization of logical to physical memory space mapping in arrays of multiple hard disk drives with banded disk surfaces.

BACKGROUND OF THE INVENTION

Rapid access to data stored on disk media is an important concern in the design of high performance computer systems. The bandwidth of the channel linking a host computer with a disk controller should be chosen to accommodate the transfer rate required to supply data to a track of the disk, or to read the track. An outer track of large radius requires a high data transfer rate, while an inner track of lesser radius requires a lesser data transfer rate, and the bandwidth must accommodate the maximum data transfer rate.

When a plurality of disk drives are operated in parallel by the controller, so that transfer units of data coming from the host computer for storage are broken down into stripes, and each stripe is directed to a different disk drive, then the data transfer rate required by the different tracks of the different disk drives must be considered. The channel must accommodate simultaneous transfer of all stripes to different disk drives. For example, if the bandwidth is designed so that data can be written to the outermost track of all disk drives simultaneously, then the bandwidth will be greater than needed on an average basis. On the other hand, if the bandwidth is designed so that it just accommodates writing to all innermost tracks simultaneously, then the bandwidth will be too small on average and available disk bandwidth will needlessly be lost.

Unsolved design problems are: how to select the bandwidth of the channel connecting a host computer to a storage subsystem and to its storage devices such as disk drives; and also how to select assignment of logical data stripes, into which the transfer unit has been broken, to physical disk tracks in order to optimize the bandwidth design of the computer system.

SUMMARY OF THE INVENTION

The invention is a method for bandwidth balancing of data transfer operations between a computer and a storage subsystem. The storage subsystem contains a number of storage devices such as magnetic disk drives. Data to be stored is supplied by the computer to the storage subsystem in the form of a transfer unit on longer transfers. The storage subsystem divides the transfer unit into a number of stripes of a pre-determined size. Each stripe is allocated to a different disk drive whose disk surfaces are formatted into a number of track bands. Each track band is composed of several contiguous tracks associated with the same data transfer rate. Each stripe is then stored on its disk drive within a selected track band. Both data storage and retrieval from each disk drive occur at the data transfer rate associated with the accessed track band. Since all the stripes in the transfer unit are transferred to their disk drives simultaneously, the transfer operation occurs at an aggregate transfer rate equal to the sum of the individual track band transfer rates. The storage subsystem selects the track bands on each disk drive in such a manner as to ensure that the data transfer operation occurs at an aggregate transfer rate within a pre-determined bandwidth range. For shorter data transfers, a similar process takes place except that multiple short transfers are executed in parallel in lieu of a single large transfer.

A more detailed understanding of the invention may be had from the following description of the preferred embodiments, given by way of example, to be read in conjunction with the accompanying drawings, wherein

DETAILED DESCRIPTION

Figure 1:
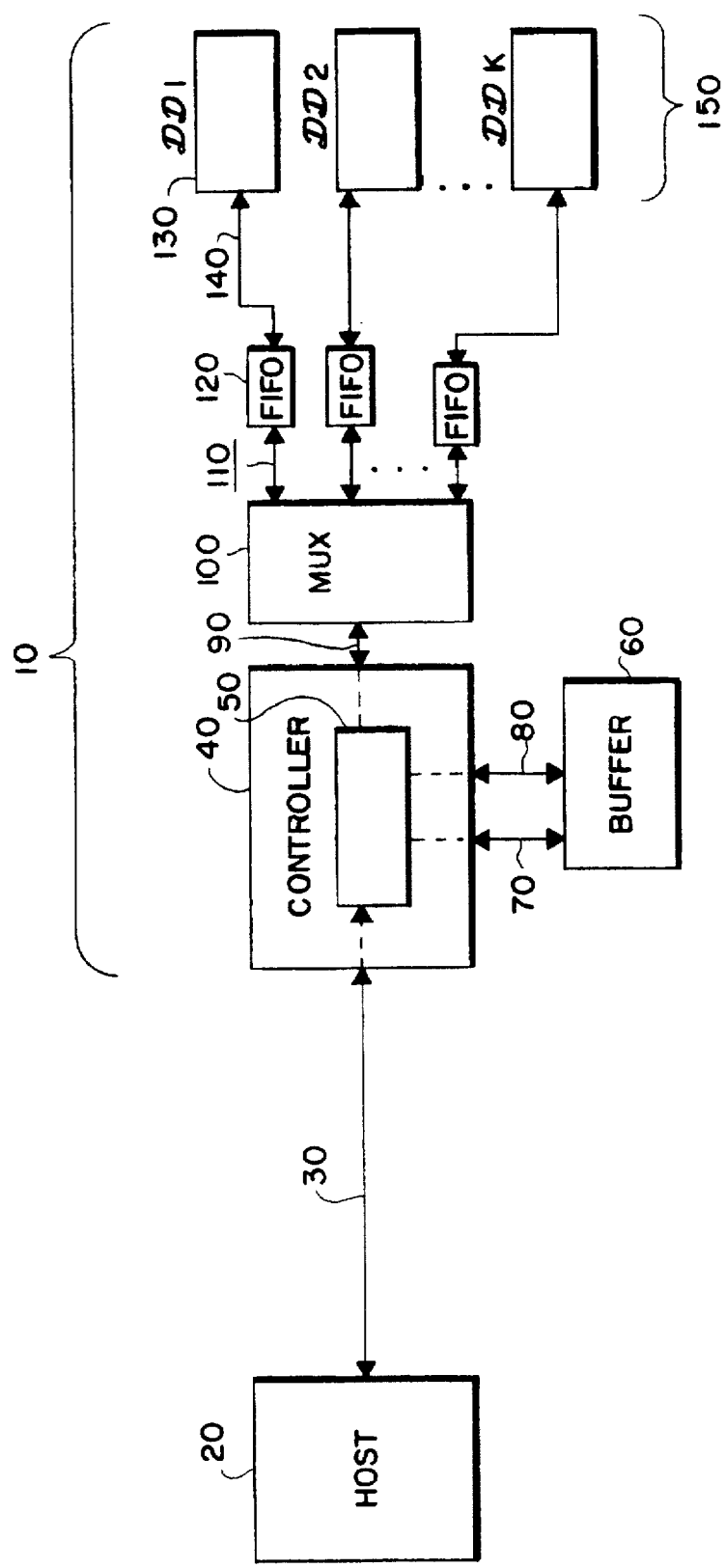
FIG. 1 is a block diagram of a storage subsystem architecture.

Grouping several hard disk drives together into what is known as disk arrays by configuring them for simultaneous data transfer has become a promising alternative to using a single high performance storage device. Disk arrays composed of several disk drives which share the same controller resource to transfer data to and from the computer host offer advantages of smaller overall storage subsystem size and cost, lower power consumption, and increased input/output (I/O) throughput. Large data transfer requests from the computer host can be fragmented into smaller segments which are then processed by the storage subsystem in a highly parallel manner by interleaving the data segments among the different disk drives in the disk array. For applications involving large size transfers, such as supercomputer simulations, using disk arrays for parallel data transfer implies an I/O bandwidth increase well in excess of an order of magnitude compared to the single device storage subsystems. For relatively small size data transfer applications, e.g. transaction processing, the disk array system architecture is also attractive because it makes several disk drives independently available for data transfer operations while distributing the input/output load relatively uniformly among the independent disk drives.

The storage subsystem architecture realizes the benefits of the disk array configuration by establishing separate interface connections between each disk drive in the array and the common storage controller. The computer host sends requests to the storage subsystem over a common computer interface bus as packets of commands which are structured to conform to an appropriate storage control protocol. Once the commands are interpreted by the storage controller, the data requested is transferred from the disk drives back to the storage controller, where it is reformatted in accordance with the storage control protocol and packets of data as well as request responses are transmitted by the controller to the computer host over the common computer interface bus.

Similarly, a request by the host computer to write data to the storage subsystem is first received by the storage controller in the form of command and data packets which are translated into a series of specific commands to one or more selected disk drives. Once the disk drives are ready to accept the data, the data is transmitted by the storage controller via the individual controller-disk interfaces and written to designated disk surface locations.

To take full advantage of the bandwidth increase potential offered by the disk array, data transfer must be properly distributed among the multiple disk drives. The data in the request is fragmented into elementary segments of contiguous data or stripes defining what is known as stripe granularity. Once way to segment the data is to divide it into stripes of identical size. The entire request is transferred as the consecutive stripes are written to distinct disk drives in the disk array.

When the array contains a large number of disk drives, stripe granularity down to a byte size would imply highly parallel data transfer and substantial increase in the storage subsystem bandwidth. However, data transfer cannot take place until positioning of the read/write transducers of each individual disk drive in the array is complete. The time required for a disk drive to seek to the desired location on a selected disk surface is known as the access time which, combined with the time lapse incurred by a read/write operation, determines the data transfer latency. When the stripe size is set at a byte level, most of the time involved in a data transfer is associated with seeking or accessing the desired disk surface in order to execute the read or write request. Since a typical request will involve a transfer of many bytes of data, most or all of the drives in the array can be seeking at the same time and the pre-execution latency will be at least equal to that of the shortest seeking individual drive. In comparison, the proportion of the data transfer latency associated with reading or writing a single byte of data will be relatively small compared to the average seek time. This is a significant issue for short data transfers.

In contrast, larger stripe sizes with block buffering allow seek overlapping among the multiple disk drives in the array so that some of the disk drives may receive their portion of the request and begin transferring data while others are still accessing the target disk surfaces. Such seek overlapping can be optimized to a broad range of transfer sizes to minimize seek activity, reduce the effect of seeks on the data transfer latency, and ensure a high bandwidth data transfer operation. One typical stripe size used in some storage subsystems is a disk sector or block size composed of 512 bytes of data. An example of a larger stripe size in common use is a full track.

The data transferred by the storage controller to each disk drive in the array is written to or read from a surface of any one of the plurality of magnetic disks by means of a read/write transducer. Typically, each disk surface is associated with one read/write transducer. All the read/write transducers are mounted on a common positioner and can access an arbitrary location on the corresponding disk surface. The disks are attached concentrically to a spindle which is compelled to rotate at a constant angular velocity by means of a closed loop control. Each disk surface is partitioned into concentric circular data tracks which are in turn divided into an integral number of sectors capable of accepting a fixed amount of contiguously disposed data, such as a block. For a single positioner carrying a plurality of identically spatially disposed read/write transducers, the tracks of a given radius on all disk surfaces of each disk drive are aligned to form a cylinder coaxial with the disk spindle. With this alignment, like numbered tracks located along the same cylinder on different disk surfaces are put within access range of their respective read/write transducers by issuing an appropriate seek command to the positioner servo and can be accessed by simply transducer switching.

When the data is written to the disk surface, each of the data blocks written to a given sector of a track is preceded by a block header and followed by an error correction code (ECC). The information contained in the header uniquely identifies the sector and its location on the disk surface, while the ECC is used to perform error correction on the sector data such as may arise from magnetic media defects, random noise and other noise sources.

The computer host transfers a request to the storage subsystem for storing or retrieving data grouped in logical memory units of specific size with each unit assigned a unique number. If the elementary logical memory unit is equal to a block, then the entire request is composed of a sequence of logical blocks identified by their respective logical block numbers (LBNs). Once the transfer request is received by the storage subsystem, the storage controller performs a mapping of the logical memory units into physical memory locations on the disk drives. If the data transfer size coincides with a single block, the storage controller establishes a logical block to sector map and the entire block is written to the selected sector on a disk surface of one of the disk drives in the storage subsystem. When the size of the requested data transfer requiring a write operation does not correspond to an integer multiple of logical blocks, the storage controller performs the request by writing a leading set composed of an integral number of full blocks and followed by a partially filled trailing block padded with zeros to adhere to a common block size transfer format.

The rate at which data is read from or written to a disk surface depends upon the capacity of the read/write channel. For a given channel throughput, the transfer rate, defined as the number of bits of data transferred by the read/write channel per unit time, for example bits/sec, is determined by the angular velocity of the disk spindle and the radial position of the respective data track. As the track radius increases, so does the linear velocity of its motion past the associated read/write transducer. Hence, for a constant transfer rate the number of data bits encountered per unit length of a track (linear or bit density) or the number of bits per unit disk surface area (aerial density) diminishes in proportion to the track radius.

To take the fullest possible advantage of the data storage capacity of the magnetic disks, it is desirable to maintain uniform aerial data density throughout the disk surface. A common approach to this is to group several radially contiguous tracks on a disk surface into bands with the same sector format. A disk surface may have a number of such track bands along its radius, with the number of sectors per track increasingly greater on the outer track bands. However, since the linear velocity of a track in an outer track band is greater than that of an inner band track, for the same aerial density on either track the number of data bits per second that must be transferred by the read/write transducer increases requiring a higher read/write channel bandwidth for outer track data transfers compared to the slower inner track bands.

The use of banded disk surfaces in the disk array leads to variable demands on the storage subsystem bandwidth. Each disk drive in the disk array communicates with the storage controller via its controller interface whose transfer rate is defined by its bandwidth capacity. With all disk drives transferring data simultaneously the effective bandwidth of the disk array is the sum of the individual bandwidths of the disk drives and their controller interfaces. In retrieving a data request from several disk drives the controller multiplexes the data streams from each drive and serializes the data stream according to the storage control protocol to deliver the data over the common computer interface bus to the computer host. Thus the serial elements of the storage subsystem, such as the shared buffers and computer host interface, must be capable of supporting the combined disk drive bandwidth in order to take advantage of the increased data throughput associated with the disk array. If each disk drive accessed in a given request is transferring data over its controller interface from the outer track band at the maximum transfer rate, the subsystem bandwidth utilization is the highest. On the other hand, with all drives transferring data from the slow inner track bands, the required subsystem bandwidth is minimal.

One of the main objectives of grouping disk drives into an array is to meet the demands for a higher storage subsystem bandwidth. To provide the bandwidth increase in an economically feasible manner the subsystem resources must be used at their optimum capacity levels. If the storage subsystem bandwidth is configured to accommodate the highest transfer rate, the bandwidth capacity is underutilized on average because for full storage capacity utilization data must be placed on all available tracks on the disk surface. Hence a sufficiently large sample transfer unit will span a range of track bands from the disk drives involved. The implication is that the array of disk drives will tend to transfer at an average aggregate bandwidth over a statistically large number of transfers. Having an over-configured subsystem bandwidth is thus undesirable because it results in inefficient and costly resource use of the serial subsystem elements such as the controller buffer shared among the disk drives in the array and the computer host interface bus.

Conversely, the disk drives making up the stripe set required to process a given transfer unit can be configured to transfer at the slowest inner track band bandwidth with the stripe set's aggregate bandwidth matching that of the subsystem channel. With the storage subsystem constrained to accept or deliver data at the inner band transfer rate, the subsystem performance is compromised falling below the average aggregate bandwidth supported by the array architecture due to increased data transfer latency as the disk drives, attempting to complete faster outer band transfers, are forced to wait by taking additional revolutions. While transfers from the faster outer track bands can be accommodated by buffering the data to sufficient extent and inserting idle disk revolutions as necessary to attain the average subsystem bandwidth, the scheme fails to take full advantage of the available disk drive bandwidths since the transfers between the disk drives and the storage controller are constrained to occur at the slowest track band rate.

The subsystem bandwidth could be designed to support the average aggregate bandwidth of the disk drive array. Sufficient data flow control features can then be added to ensure that the subsystem capacity is not exceeded. However, if the data mapping from the logical memory space to the physical locations on the disk surfaces is not devised specifically to reduce the probability of transfers falling outside the average aggregate bandwidth range of the disk array, the number of requests simultaneously involving the outer track bands on the disk drives in the stripe set remains unacceptably large. This imposes excessive bandwidth requirements on the storage subsystem which in turn results in increased data transfer latency as the disk drives incur additional disk revolutions before completing their portion of the transfer request.

Referring now to the drawings and in particular to FIG. 1, there is shown a storage subsystem 10 connected to a computer host 20 via a computer interface bus 30. The computer interface bus 30 provides the communication link for command and data flow between computer host 20 and a storage controller 40. Storage controller 40 includes a microprocessor block 50 which effects interpretation of commands for data transfer received from computer host 20 according to an appropriate storage control protocol and controls data flow between computer host 20 and other storage subsystem elements. To decouple data movement between computer host 20 and storage controller 40 from the data activity occurring within storage subsystem 10, a transfer unit in the form of a formatted packet of serial data arriving from computer host 20 is first placed into a buffer 60 via host buffer interface 70. The data in buffer 60 is further transferred under control of microprocessor block 50 of storage controller 40 via a drive buffer interface 80 and a serial (serial may mean bit, byte or word wide serial) interface 90 to a serial input/output (I/O) terminal of a drive multiplexer (designated as MUX) 100. The serial data stream is then divided by storage controller 40 into stripes of predetermined size which are distributed among a set of parallel drive interfaces 110. The stream of data on each drive interface 110 is placed into a respective FIFO block 120 used for short term buffering of data transferred to and from its associated disk drive 130 via device interface 140. The intermediate data buffering using FIFO blocks 120 allows partial decoupling of the data flow in the event that the instantaneous bandwidth of parallel data transfer to and from a stripe set of disk drives 130 in a disk array 150 occurs at a combined transfer rate exceeding the bandwidth of serial interface 90.

Figure 2:
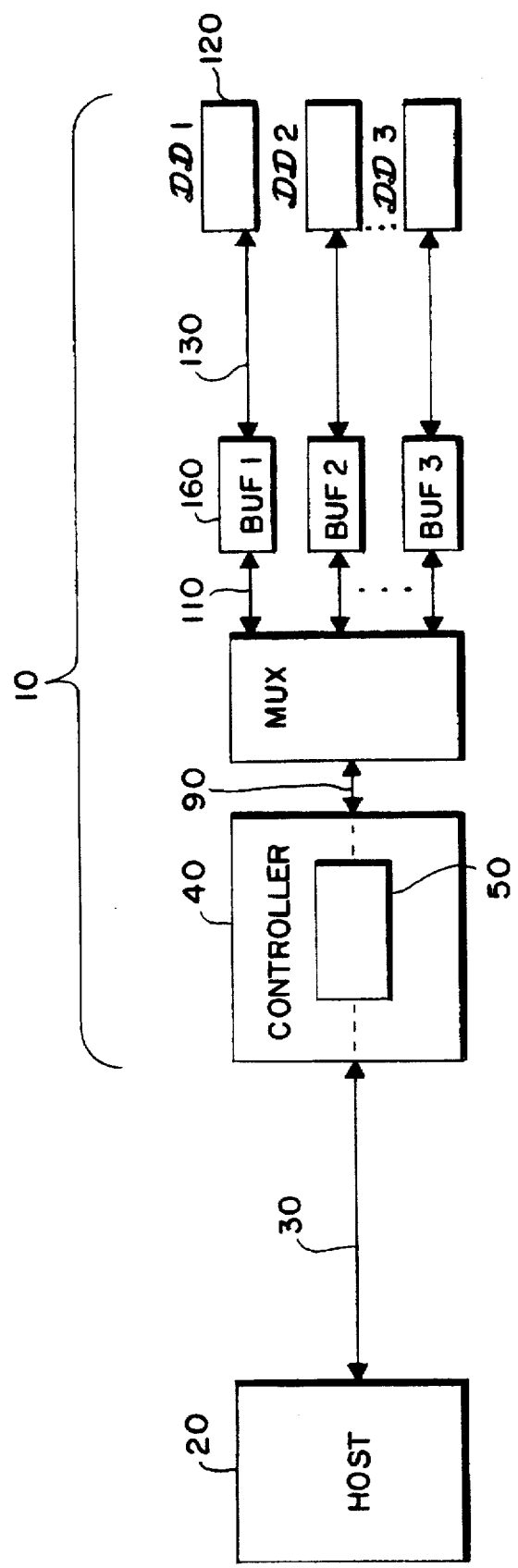
FIG. 2 is a block diagram of an alternative implementation of the storage subsystem architecture.

The aforementioned storage subsystem architecture can be modified, while retaining all of its essential functionality, to the structure depicted in FIG. 2. There, the single buffer 60 is replaced with a bank of dedicated buffers 160, each being associated with a distinct disk drive 120 in disk array 150.

While accommodating the diversity in transfer rates between disk drives 120 and controller 40 on the one hand, and controller 40 and computer host 20, on the other, is an important purpose of data buffering, error checking and detection of striped data transfers often relies on buffer use as well. To increase data reliability in storage subsystems utilizing the disk array architecture such as those shown in FIGS. 1 and 2, a write operation to a stripe set of disk drives 120 is preceded by error checking such as the Hamming code parity computation or, sometimes, more elaborate strategies. Stripes of data making up a single transfer request, e.g. blocks, which are destined for different disk drives undergo modulo 2 bitwise addition which can be implemented by means of standard Exclusive-OR (XOR) gate circuitry. The addition is used to generate a parity check pattern which is written to a designated area, such as a known sector on a disk surface of a check drive or an appropriately mapped check sector which is interleaved with the data on one or more disk drives in the disk array 150. When the associated data is retrieved, the parity check block is read into buffer 60 or one of the buffers 160 along with the data blocks to allow storage controller 40 to perform error detection and correction, if necessary, before the data is transferred to computer host 20.

Figure 3:
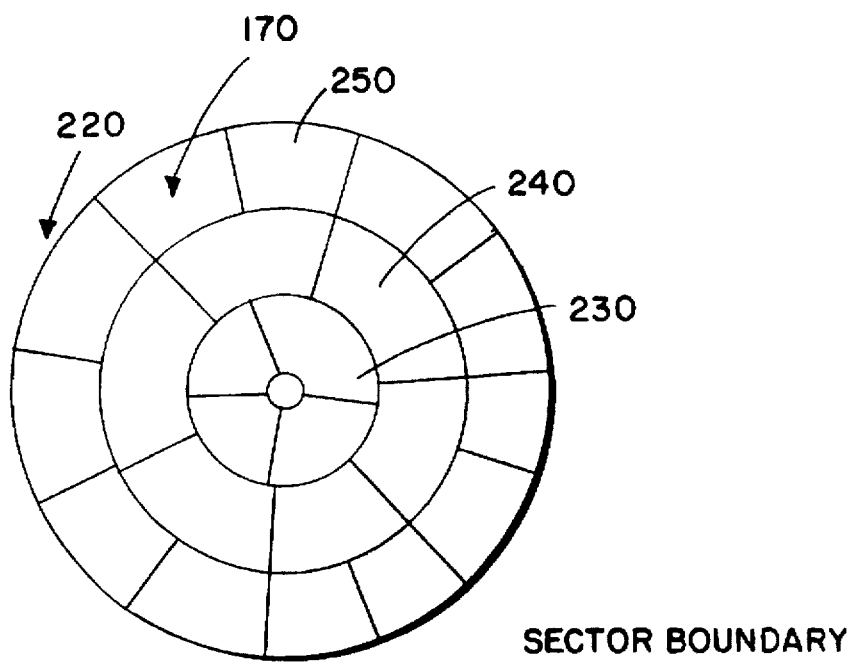
FIG. 3 is a simplified depiction of an unbanded disk surface and a positioner carrying a read/write head.

It is possible to format each disk surface 170 of a disk drive 120 to have a constant number of sectors on every track, as shown in FIG. 3. With sector boundaries 180 aligned radially throughout disk surface 170, each sector 190 is traversed by the read/write head 200 mounted on a positioner 210 and associated with the disk surface in the same period of time. Hence, the same amount of data, such as a 512 byte block, can be written to each track within every sector 190. This uniform sector format of disk surface 170 with the same number of data bits stored between any two consecutive sector boundaries 180 leads to a constant data transfer rate from any track regardless of its radius. If a transfer unit is distributed among a stripe set of disk drives 130, all the drives can participate in the data movement simultaneously. In the ideal case of a fully parallel transfer the aggregate device bandwidth is thus equal to the individual disk drive bandwidth times the number of drives in the stripe set.

Figure 4:
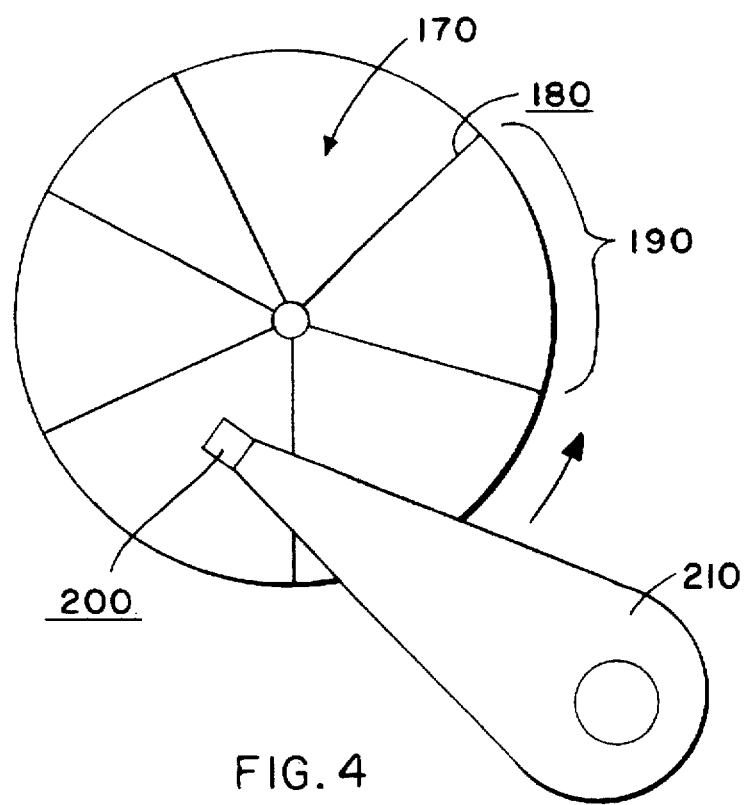
FIG. 4 is a simplified depiction of a banded disk surface.

However, the uniform sector format of FIG. 3 results in poor utilization of magnetic media storage capacity. Since the length of the track segment bounded by the adjacent sector boundaries 190 increases with the track radius, the linear bit density on the outer tracks is lower than that on the shorter inner tracks. An effective way to prevent loss of useful storage capacity is to divide the disk surface into a number of bands of neighboring tracks. As is depicted in a simplified diagram of FIG. 4, each track band is formatted, for example, to have the same number of sectors, each sector defining the length of a track segment needed to store a block of data. An ever greater number of sectors is written on the outer bands in order to maintain a more nearly constant linear bit density throughout the disk surface. As a disk 220 is rotated at a constant angular velocity, however, the linear velocity of the tracks moving past read/write head 200 increases in direct proportion to the track radius. Since the intent of track banding is to produce a uniform linear bit density on every track, the number of data bits encountered by read/write head per unit time grows linearly with its velocity and, therefore, disk radius. Hence, the data transfer rate with read/write head 200 positioned over a track in an inner band 230 is the lowest, increasing for tracks in a middle band 240, and reaching its maximum for transfers involving tracks located in an outer band 250.

Data transfers from different track bands thus create a variable demand on the bandwidth of interfaces connecting each disk drive 130 to the rest of storage subsystem 10. Even with the bandwidths of device interface 140 and drive interface 110 designed to sustain the highest transfer rates from a given disk drive 130 in disk array 150, the overall storage subsystem bandwidth will depend upon the data movement through the shared communication channels such as serial interface 90, host and drive buffer interfaces 70, 80, and computer interface bus 30. Since data interchanged between computer host 20 and storage subsystem 10 must pass through each one of the serial elements in succession, the storage subsystem bandwidth is determined by the fixed bandwidth of the slowest serial element. Attempting to connect banded disk drives 130, organized into the parallel structure of disk array 150 and requiring variable bandwidth, to fixed bandwidth serial elements results in excessive data transfer latency and poor subsystem performance if storage subsystem 10 is configured to transfer data at the lowest rate associated with inner track band 230. If, on the other hand, the serial elements are configured to support data transfers at the highest rate, i.e. those involving outer track bands 250 only, the total storage subsystem capacity is underutilized since only the average bandwidth is required over a sufficiently large number of transfer requests.

Figure 5:
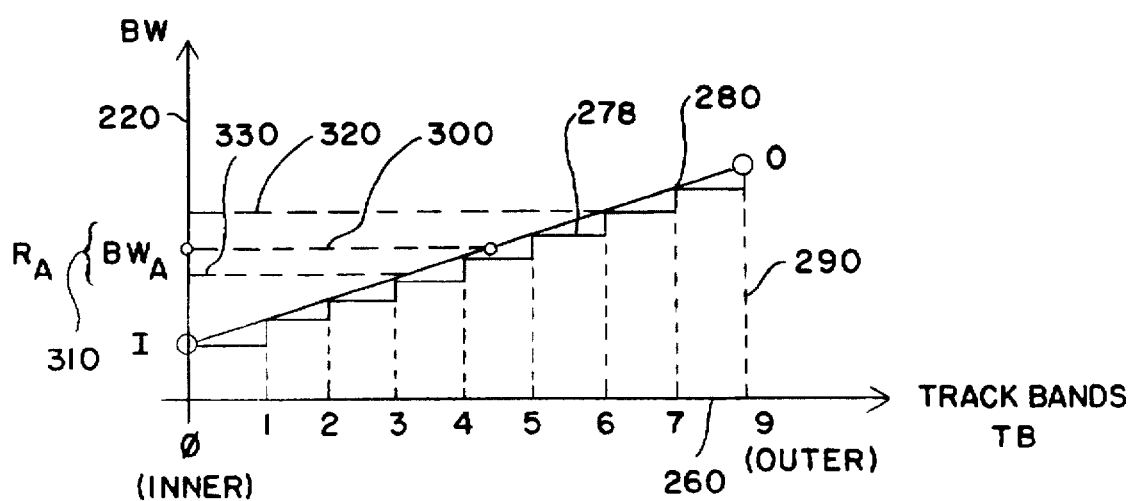
FIG. 5 is a graph of the disk drive channel bandwidth versus track band.

The effect of bandwidth variability inherent in the use of banded disk surfaces is depicted in FIG. 5 where the horizontal axis 260 denotes track bands (designated as TB) and the vertical axis 270 represents the track bandwidth (designated as BW). The staircase line segments 278 together define a possible functional relationship between BW and TB in disk drive 130. The magnitude of each step represents the bandwidth associated with the respective track band. A line 280 is a continuous approximation of line 278. As seen in FIG. 5, a data transfer from inner track band 230 of each disk drive 130 in disk array 150 requires the lowest bandwidth, defined by the intersection of lines 280 and 270, and designated as point I. Conversely, transfer request from outer track bands 250 imposes the highest bandwidth demand represented by the intersection of lines 280 and a vertical line 290 which is designated as point O in FIG. 5. Since complete utilization of the storage capacity of each disk surface requires transfers from every track band, given a constant aerial density throughout disk surface 170, the average bandwidth (designated BWa) utilized over a sufficiently large number of data transfers from each disk drive 130 will fall in the range of middle track band 240, as given by the intersection of lines 300 and 270.

The bandwidth requirement will equal BWa exactly only in the limiting case of an infinitely large number of transfer operations so that the practical bandwidth average for commonly occurring transfer requests experienced by a given disk drive 130 will occur in an average range 310 (denoted as Ra in FIG. 5) bounded-above by the intersection of lines 270 and 320, and below by the intersection of lines 270 and 330. Such bandwidth variability is easily accommodated by providing each disk drive 130 with either FIFO block 120 or dedicated buffer 160 of sufficient capacity.

In accordance with the invention, the efficient utilization of a given bandwidth capacity of each element in storage subsystem 10 is achieved by configuring the stripe set of disk drives 130 in disk array 150 to perform data transfers in such a manner as to minimize the deviation of instantaneous bandwidth requirement from the average BWa, i.e. ensure that it falls within average bandwidth range Ra. This can be done by distributing the transfer unit evenly among all the track bands of the stripe set. With each available track band being involved in performing such requests, the aggregate bandwidth of data transfers from the stripe set will always be an integer multiple of BWa. Since the transfer unit size varies considerably, occasional deviations from the exact average aggregate bandwidth, which occur whenever the selected stripe size prevents even data distribution among all the track bands, will be handled by appropriate buffering of data flow between disk array 150 and storage controller 40.

Figure 6:
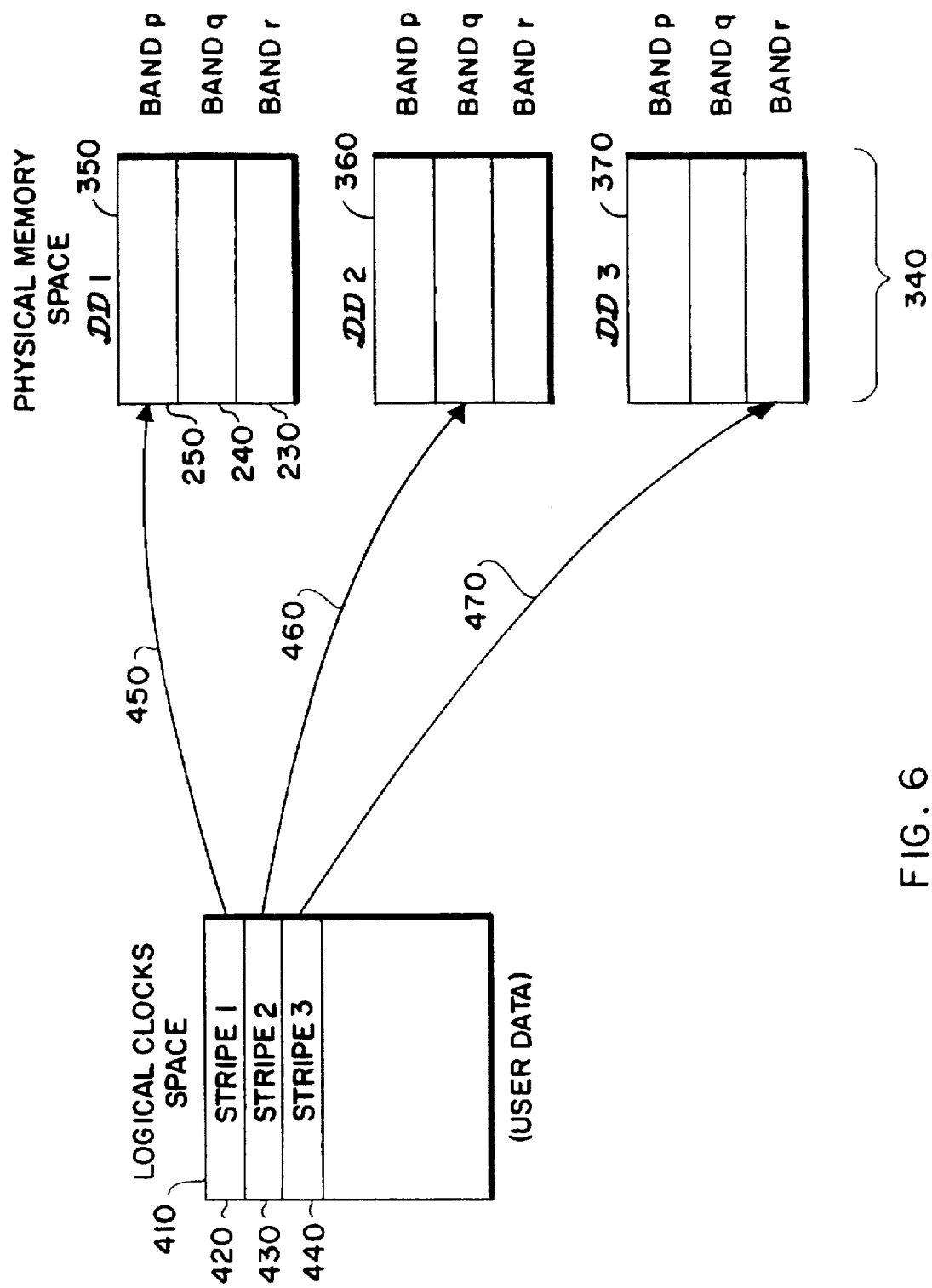
FIG. 6 is a conceptual diagram depicting an embodiment of a logical to physical memory mapping for a stripe set of three disk drives.

An example of mapping logical units of user data into physical locations on disk surfaces 170 of disk array 150 is depicted in FIG. 6. Assume the stripe granularity of one track. Assume further that the stripe set 340 is made up of three disk drives 350, 360, and 370 (designated as DD1, DD2, and DD3, respectively). Assume further that each disk drive contains a single disk surface with three track bands 230, 240, 250 (denoted p, q, and r in FIG. 6). Storage controller 40, under control of microprocessor block 50, performs fragmentation of transfer unit 410 into preferably contiguous stripes of data 420, 430, and 440 (depicted as stripe 1, stripe 2, and stripe 3). Even distribution of data among the various track bands is preferably achieved by mapping stripe 1 to band p of DD1, stripe 2 to band q of DD2, and stripe 3 to band r of DD3, as indicated by arrows 450, 460, and 470, respectively. The foregoing mapping cycle is continued until the entire transfer unit 410 is stored on disk drives of stripe set 340. With each disk drive transferring data at the rate compatible with the accessed track band, the disk drive bandwidth across stripe set 340 is utilized with maximum efficiency.

Figure 7:
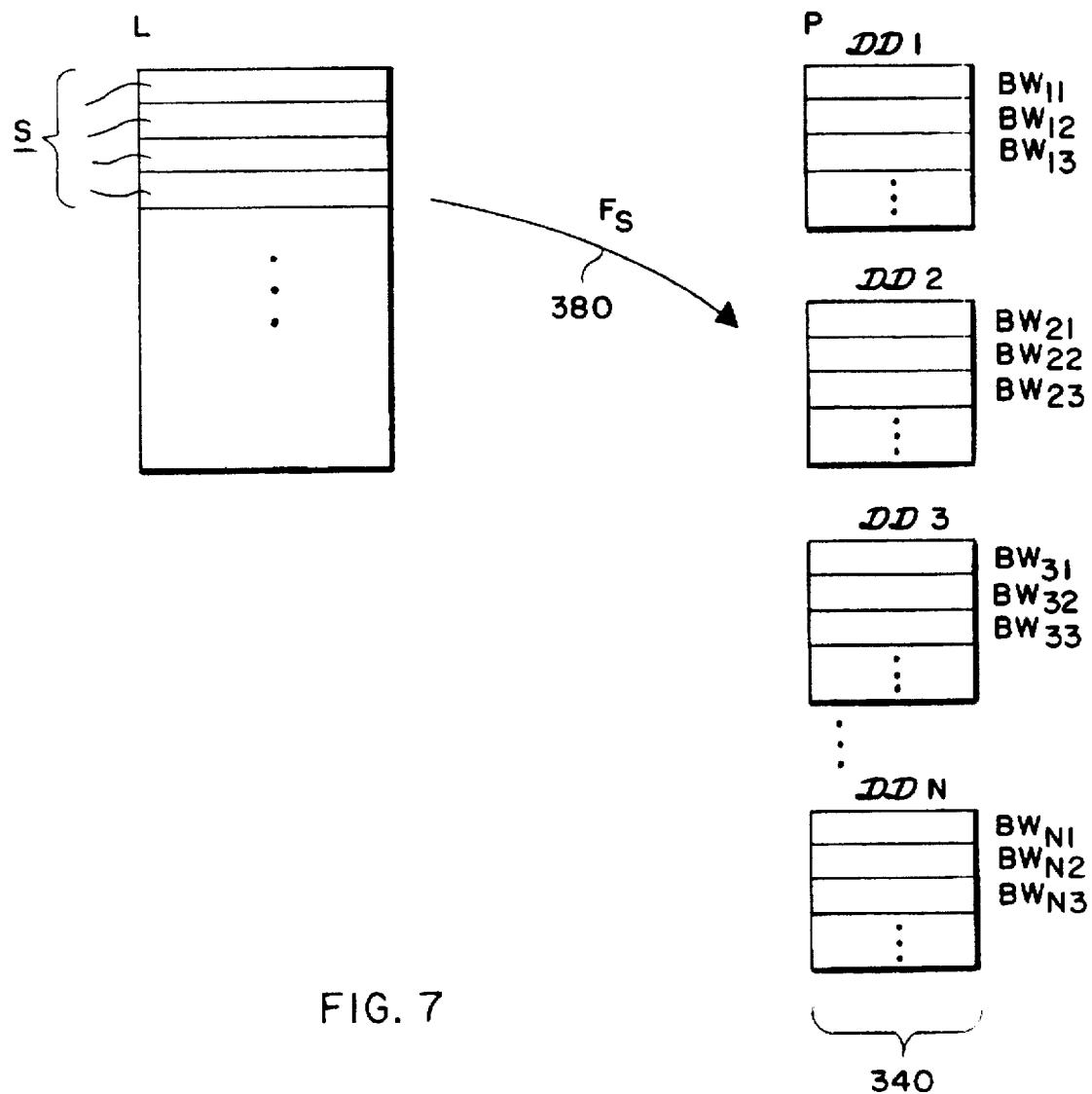
FIG. 7 is a diagram generalizing the concept of the logical to physical memory mapping for a stripe set consisting of an arbitrary number of disk drives.

The logical to physical memory mapping of FIG. 6 is generalized in FIG. 7 where L denotes the logical memory space containing the user data to be transferred from computer host 20 to storage subsystem 10. P is the physical memory space defined by the storage capacity of stripe set 340. s is the selected stripe size fragmenting each transfer unit 410 into stripes which are allocated to disk drives denoted DD1 through DDN in stripe set 340. Fs denotes the mapping function depicted by an arrow 380. Each disk drive DDi of stripe set 340 can have up to M track bands, denoted in FIG. 7 by the associated bandwidths BWij, where index i defines the ith disk drive DDi, while index j identifies jth track band in that drive.

In accordance with the invention, function Fs mapping transfer unit 410 in L into P is such as to maintain virtually constant storage subsystem bandwidth, i.e.

$$\sum_{i=1}^{N} \sum_{j=1}^{M} BW_{ij} \times k_{ij} = BW_{ag} = \text{const} \quad (1)$$

where $k_{ij}$ is the number of times jth track band of ith disk drive $DD_i$ has been involved in data transfer during a given request.

In Equation (1), if ith disk drive DDi does not have jth track band, $BW_{ij}=0$. Furthermore, if $BW_{ij}=BW_{ij}$, i.e. each disk drive 120 in stripe set 340 has its disk surfaces formatted to have the same track bands, Equation (1) reduces to $$\sum_{i=1}^{M \times N} BW_i \times k_i = BW_{ag} = \text{const} \quad (2)$$

Equation (1), in accordance with the invention, will hold even if disk drives in stripe set 340 accessed during the data transfer operation do not have the same number of tracks per each track band, nor is it necessary that the bandwidths of the track bands on the distinct disk drives be the same. Furthermore, disk drives in stripe set 340 need not have the same number of track bands for Equation (1) to be satisfied for a given transfer operation. The result of Equation (1) can also be achieved by varying the number N of disk drives in stripe set 340. Thus, a transfer request from outer track bands would involve fewer disk drives to achieve BW. If the stripe set is configured to sustain data transfers from contiguous tracks in the same or neighboring track band, seek activity of other disk drives in disk array 150 can be performed in an overlapped manner resulting in potentially significant reduction of data transfer latency.

Equation (1) does not require that $$BW_{ag} = \frac{(BW_{inner} + BW_{outer})}{2} = BW_a \quad (3)$$

where $BW_{inner}$ and $BW_{outer}$ denote the bandwidths of transfers occurring exclusively from inner track band 230 and outer track band 250, respectively. In general, $BW_{ag}$ approaches the mean bandwidth in a statistical sense since each track band of every disk surface 170 must eventually be accessed for full storage capacity utilization. In the limiting case of unbanded disk surfaces, BW is always constant and equal to the individual disk drive bandwidth multiplied by the number of disk drives in the stripe set, hence Equation (1) is satisfied for any function $F_s$. However, for banded disk surfaces bandwidth variability in Equation (1) is accounted for, in accordance with the invention, by properly selecting mapping function $F_s$ to ensure that aggregate bandwidth $BW_{ag}$ supported by stripe set 340 remains substantially constant for any data transfer request.

The underlying principles of the invention are further elucidated by way of several examples illustrating the selection of an appropriate mapping function $F_s$.

EXAMPLE 1

Assume that stripe set 340 consists of three disk drives each having three track bands as depicted in FIG. 6. Assume further that each track band has two tracks and that transfer unit 410 is divided into stripes equal to one track in size. Let number 1, the lowest logical track number, be assigned to the outer track of outer band 250 (denoted p in FIG. 6) of the first disk drive $DD_1$. Data transfer begins with the portion of the data equal to the whole of logical track 1 being transferred to the outer track in band p of $DD_1$, next the entire logical track 2 is transferred to an appropriate physical track located on $DD_2$ and so on until the transfer request is completed. The conventional assignment of the logical tracks to the physical tracks available on the three disk drives in stripe set 340 is performed sequentially as given by table 1 below.

TABLE 1

Traditional logical to physical track assignment

|  |  |  |  | $DD_1$ | $DD_2$ | $DD_3$ |
|---|---|---|---|---|---|---|
| outer | track | band p | physical track 1 | 1 | 2 | 3 |
|  |  | band p | physical track 2 | 4 | 5 | 6 |
|  |  | band q | physical track 3 | 7 | 8 | 9 |
|  |  | band q | physical track 4 | 10 | 11 | 12 |
|  |  | band r | physical track 5 | 13 | 14 | 15 |
| inner | track | band r | physical track 6 | 16 | 17 | 18 |

In contrast, a logical to physical track assignment scheme, according to the invention, ensures that no two adjacent logical tracks are located in the same track band, as detailed in table 2.

TABLE 2

Half-Determinantal logical to physical track assignment.

|  |  |  |  | $DD_1$ | $DD_2$ | $DD_3$ |
|---|---|---|---|---|---|---|
|  |  | band p | physical track 1 | 1 | 14 | 9 |
|  |  | band p | physical track 2 | 4 | 17 | 12 |
|  |  | band q | physical track 3 | 7 | 2 | 15 |
|  |  | band q | physical track 4 | 10 | 5 | 18 |
|  |  | band r | physical track 5 | 13 | 8 | 3 |
| inner | track | band r | physical track 6 | 16 | 11 | 6 |

The name of $F_s$, defined by the logical to physical track assignment scheme of table 2, derives from the observation that each group of three consecutive logical tracks is assigned to the locations corresponding to the entries of the terms used to compute the first half of the determinant of one of the two superimposed matrices in table 2.

Figure 8:
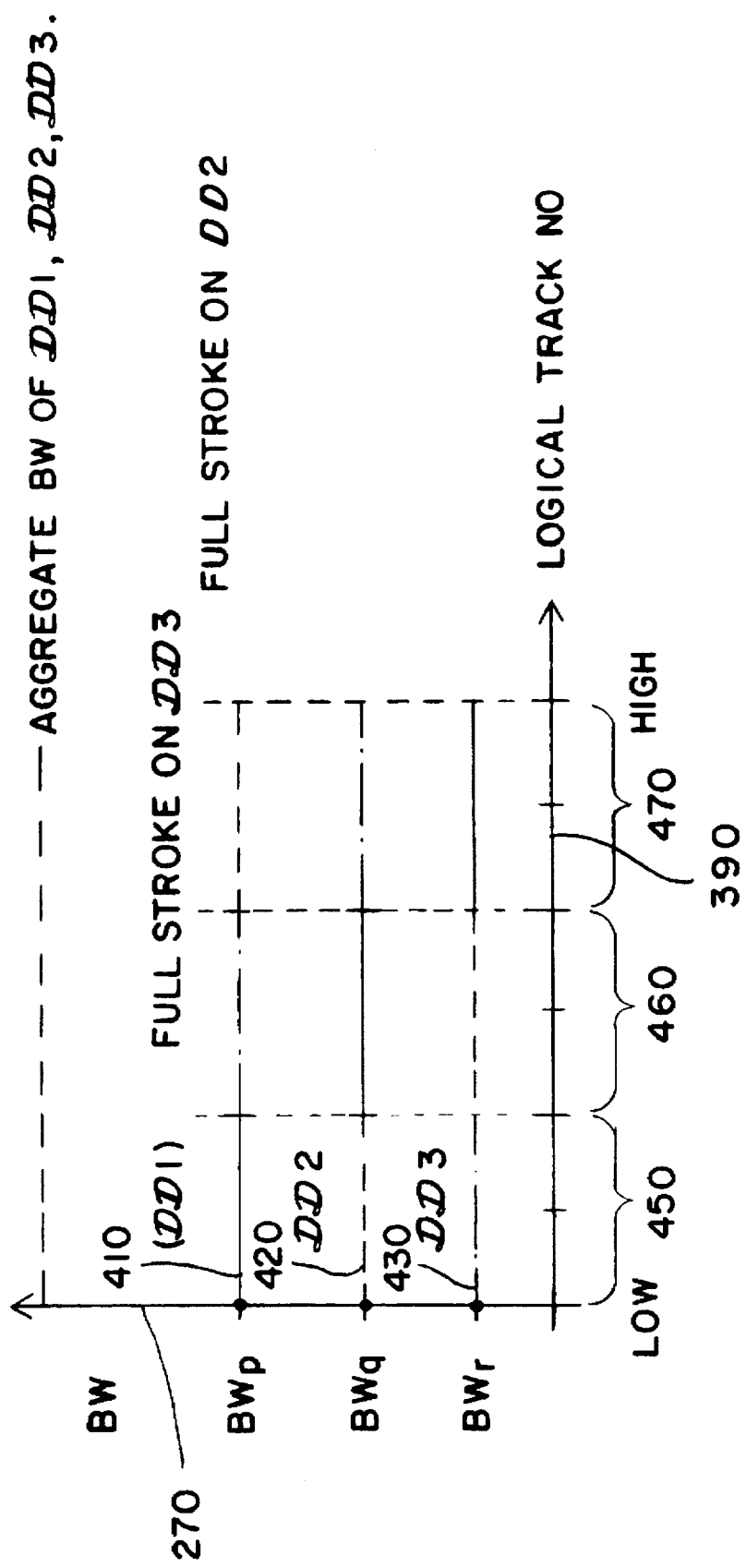
FIG. 8 is a graph of the bandwidth versus the logical track number according to an embodiment of the invention.

The bandwidth balancing effect of $F_s$ in Example 1 is further illustrated in FIG. 8 where the horizontal axis 390 denotes the logical track numbers in ascending order. Bandwidth requirements for successive transfers from $DD_1$ are depicted by line 410, those from $DD_2$ are represented by line 420, while those involving $DD_3$ are delineated by line 430. In particular, to transfer data in a track range 450, e.g. that contained in logical tracks 1, 2, and 3, track band p of $DD_1$, track band q of $DD_2$, and track band r of $DD_3$ are accessed. The aggregate bandwidth $BW_{ag}$, denoted by line 440 in FIG. 8, is equal to 3 times the bandwidth associated with track band q.

Similarly, data transfers involving logical tracks in a range 460 are effected with $DD_1$ transferring from track band q, $DD_2$ transferring from track band r, and $DD_3$ transferring from track band p, after a full stroke seek from track band r. The net result is, again, the aggregate bandwidth equal to 3 times that associated with track band q.

In an analogous manner, $BW_{ag}$ is unchanged with transfers involving logical tracks range 470 because $DD_1$ is transferring from track band r, $DD_2$, having undergone a full stroke seek to outer track band 250, is transferring from track band p, while $DD_3$ is transferring from track band q.

The mapping function of table 2 will result in a constant aggregate transfer bandwidth equal to three times the bandwidth of middle track band 240 if, for example, the number of disk drives in stripe set 340 is equal to the number of track bands, i.e. the matrices of table 2 are square, and if each transfer unit 410 can be divided into track size stripes whose number is an integer multiple of the number of disk drives in stripe set 340, e.g. 3, 6, 9, and so on. Moreover, exact bandwidth averaging will also be achieved if the number of disk drives ($N_d$) in stripe set 340 is equal to an integer multiple of the number of track bands ($N_b$), i.e. $N_d=k\times N_b$, where k is an integer.

EXAMPLE 2

Another way to attain a balanced aggregate bandwidth is to select $F_s$ so that adjacent logical tracks are assigned alternately to high and low bandwidth track bands, as shown in table 3, where a fourth disk drive $DD_4$ is added to stripe set 340.

TABLE 3

Alternate logical to physical track assignment.

|  |  |  |  | $DD_1$ | $DD_2$ | $DD_3$ | $DD_4$ |
|---|---|---|---|---|---|---|---|
| outer | track | band p | physical track 1 | 1 | 22 | 3 | 24 |
|  |  | band p | physical track 2 | 5 | 18 | 7 | 20 |
|  |  | band q | physical track 3 | 9 | 14 | 11 | 20 |
|  |  | band q | physical track 4 | 13 | 10 | 15 | 12 |

TABLE 3-continued

Alternate logical to physical track assignment.

|  |  |  |  | $DD_1$ | $DD_2$ | $DD_3$ | $DD_4$ |
|---|---|---|---|---|---|---|---|
|  |  | band r | physical track 5 | 17 | 6 | 19 | 8 |
| inner | track | band r | physical track 6 | 21 | 2 | 23 | 4 |

In this scheme, $F_s$ is chosen such that any set consisting of an even number of logically contiguous tracks has the same number of tracks disposed on either side of middle track band q with each track in the fast track band p having a matching track in the slow track band r. An additional advantage of this mapping is that no disk drive is required to perform a full stroke seek as the logical tracks are accessed in order.

EXAMPLE 3

Straight application of the mapping function described in Example 2 requires an even number of disk drives in stripe set 340. However, since practical disk drives rely on both sides of disks for data storage, even if the number of disk drives in stripe set 340 is odd, bandwidth balancing can be accomplished in the manner illustrated in table 4, where $S_1$ and $S_2$ represent the two surfaces of the disk(s) associated with each disk drive $DD_1$ through $DD_3$.

TABLE 4

Serpentine logical to physical track assignment.

|  |  |  |  | $DD_1$ | $DD_1$ | $DD_2$ | $DD_2$ | $DD_3$ | $DD_3$ |
|---|---|---|---|---|---|---|---|---|---|
|  |  |  |  | $S_1$ | $S_2$ | $S_1$ | $S_2$ | $S_1$ | $S_2$ |
|  |  | band p | phys trk 1 | 1 | 34 | 26 | 23 | 12 | 15 |
|  |  | band p | phys trk 2 | 4 | 31 | 29 | 20 | 9 | 18 |
|  |  | band q | phys trk 3 | 7 | 28 | 32 | 17 | 6 | 21 |
|  |  | band q | phys trk 4 | 10 | 25 | 35 | 14 | 3 | 24 |
|  |  | band r | phys trk 5 | 13 | 22 | 2 | 11 | 36 | 27 |
| inner | trk | band r | phys trk 6 | 16 | 19 | 5 | 8 | 33 | 30 |

Each disk drive in stripe set 340 accesses logical tracks in ascending order as read/write head 200 is moved in the same direction (e.g. from the outer track toward the inner track) across the disk surface. Once the inner or outer track boundary of the disk surface is reached, a switch is made to the adjacent disk surface which is then traversed in the radially opposite direction (e.g. from the inner to the outer track). Further bandwidth balancing is attained by offsetting the starting (lowest numbered) logical track to lie in a different track band for each disk surface pair. As the scheme of Table 4 illustrates, accessing any 3 contiguous logical tracks involves all three track bands, while preventing time consuming full stroke seeks for any size transfer, in agreement with the scheme of Example 2.

In practice, exact bandwidth averaging detailed in Examples 1 through 3 can be only approximately sustained since track band capacities, assumed to be constant in the examples, vary to some degree. However, the approximate bandwidth balancing attainable with these schemes represents a significant advantage over the traditional solutions constrained to the slowest track band.

The bandwidth balancing schemes of the invention are equally applicable to disk array configurations which include additional check disk drives or disk surfaces for data parity checking and error detection and correction.

Moreover, such bandwidth averaging is advantageous primarily when the stripe set of disk drives is configured to support high subsystem bandwidth requirements and can be implemented as a selectable option as the storage subsystem workload needs generate a demand for increased bandwidth. Implementation is straightforward and performed completely in software.

The foregoing description of the preferred embodiments is offered solely by way of illustration of the underlying principles of the invention. Many changes, modifications, and variations apparent to those skilled in the art will suggest themselves and are to be taken as embraced within the spirit and the scope of the appended claims.

We claim:

1. An apparatus for writing data to a plurality of disk drives, the apparatus comprising:
    means for receiving a transfer unit from a computer host through a communication channel having a bandwidth;
    means for dividing the transfer unit into a number of stripes of data of predetermined size;
    means for selecting tracks on different disk drives for storage of the stripes of data, each track requiring a different track data transfer rate, the tracks being so selected that a sum of the data transfer rates is substantially equal to the bandwidth of the communication channel; and
    means for storing each stripe of data on the corresponding selected track.

2. The apparatus of claim 1 wherein the tracks are sorted into track bands, each track band having at least two contiguous tracks.

3. The apparatus of claim 1 wherein the sum of the data transfer rates is a multiple of an average of the track data transfer rates of all tracks.

4. A method for performing an information transfer operation between a computer host and a storage subsystem having a plurality of disk drives, the method comprising the steps of:
    separating each information transfer unit exchanged between the computer host and the storage subsystem into a sequence of stripes of data of pre-determined size;
    allocating the stripes of data among the disk drives of the storage subsystem; and
    adjusting a rate of transferring information to and from each individual disk drive while keeping the transfer rate for each individual disk drive different from each of the other individual disk drives and maintaining the sum of the transfer rates to match an aggregate transfer rate which is substantially a pre-determined bandwidth of the storage subsystem.

5. The method of claim 4 wherein the step of allocating the stripes of data among the disk drives, each disk drive having at least one disk provided with at least one disk surface, the disk surface being formatted into separate bands of contiguous tracks, further comprises the steps of:
    selecting a stripe set of disk drives for parallel access during the information transfer operation;
    selecting a track band on each disk drive in the stripe set;
    assigning a stripe of data to each of the selected track bands; and
    assigning each stripe of data to a track band on a separate disk drive.

6. The method of claim 4 wherein the aggregate transfer rate is a multiple of an average of the track data transfer rates of all tracks.

7. The method of claim 5 wherein each stripe of data within a group of at least two consecutive stripes of data in the stripe sequence is assigned to a unique track band on its associated disk drive in the stripe set.

8. The method of claim 5 wherein the step of assigning a stripe of data to each of the selected track bands further comprises the steps of:
    assigning the neighboring stripes of data in the sequence to the adjacent track bands, each track band located on the first disk surface of a separate disk drive in the stripe set;
    continuing the sequential assignment of the stripes of data to the track bands on the first disk surface of each disk drive until the end of the first disk surface in one radial direction is reached;
    resuming the sequential assignment of the stripes of data to the track bands on the adjacent disk surface in the radial direction opposite to the radial direction of assignment on the first surface.

9. A method for writing data to a plurality of disk drives, the apparatus comprising:
    receiving a transfer unit from a computer host through a communication channel having a bandwidth;
    dividing the transfer unit into a number of stripes of data of predetermined size;
    selecting tracks on different disk drives for storage of said stripes of data, each track requiring a different track data transfer rate, the tracks being selected so that a sum of the data transfer rates is substantially equal to the bandwidth of the communication channel; and
    storing each stripe of data on the corresponding selected track.

10. The method of claim 9 further comprising the step of sorting the tracks into track bands, each track band having at least two contiguous tracks.

11. The method of claim 9 wherein the sum of the data transfer rates is a multiple of an average of the track data transfer rates of all tracks.

12. An apparatus for performing an information transfer operation between a computer host and a storage subsystem having a plurality of disk drives, the apparatus comprising:
    means for separating each information transfer unit exchanged between the computer host and the storage subsystem into a sequence of stripes of data of pre-determined size;
    means for allocating the stripes of data among the disk drives of the storage subsystem; and
    means for adjusting a rate of transferring information to and from each individual disk drive while keeping the transfer rate for each disk drive different from each of the other individual disk drives and maintaining the sum of the transfer rates to match an aggregate transfer rate which is substantially a pre-determined bandwidth of the storage subsystem.

13. The apparatus of claim 12 wherein the means for allocating the stripes of data among the disk drives, each disk drive having at least one disk provided with at least one disk surface, the disk surface being formatted into separate bands of contiguous tracks, further comprises:
    means for selecting a stripe set of disk drives for parallel access during the information transfer operation;
    means for selecting a track band on each disk drive in the stripe set;
    means for assigning a stripe of data to each of the selected track bands; and
    means for assigning each stripe of data to a track band on a separate disk drive.

14. The apparatus of claim 12 wherein the aggregate transfer rate is a multiple of an average of the track data transfer rates of all tracks.

* * * * *